No. 746,623. PATENTED DEC. 8, 1903.
Z. C. WOMBLE.
HYDRAULIC MILK COOLER.
APPLICATION FILED APR. 2, 1903.
NO MODEL. 2 SHEETS—SHEET 1.
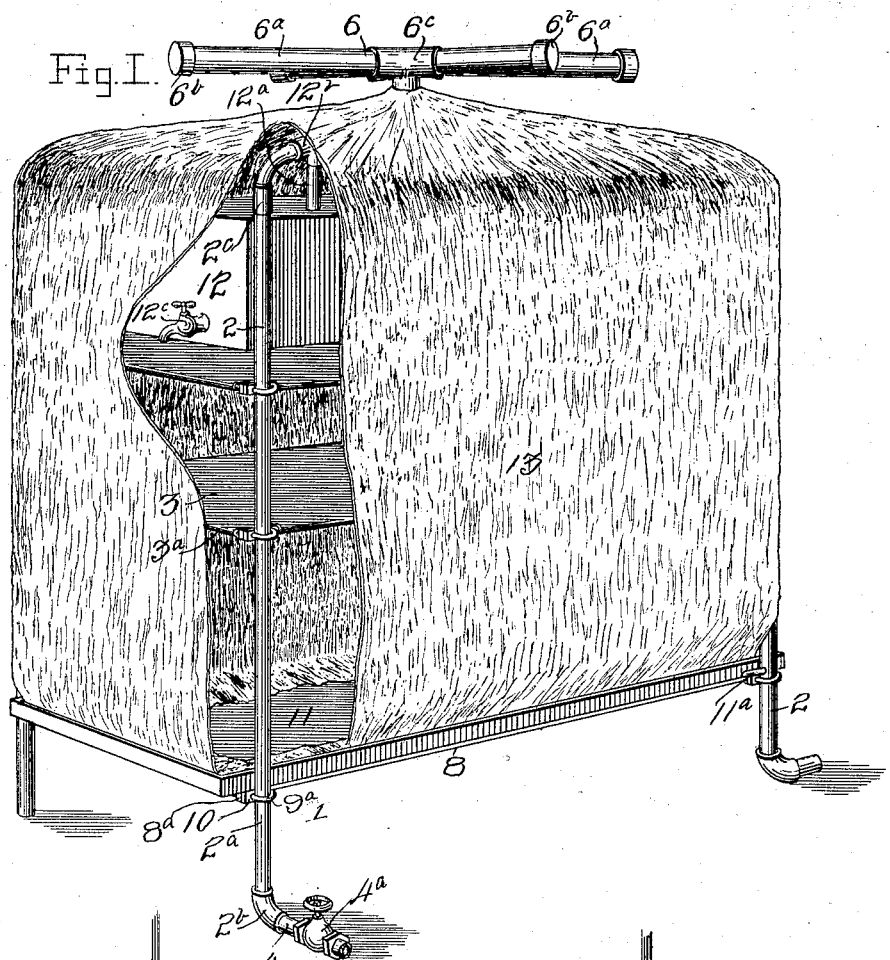
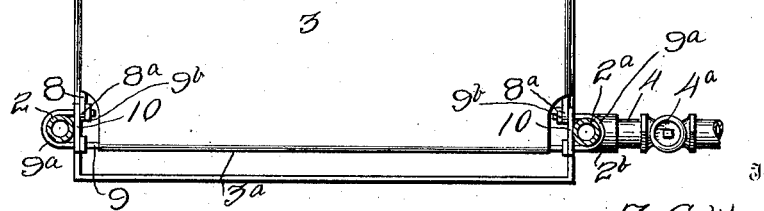

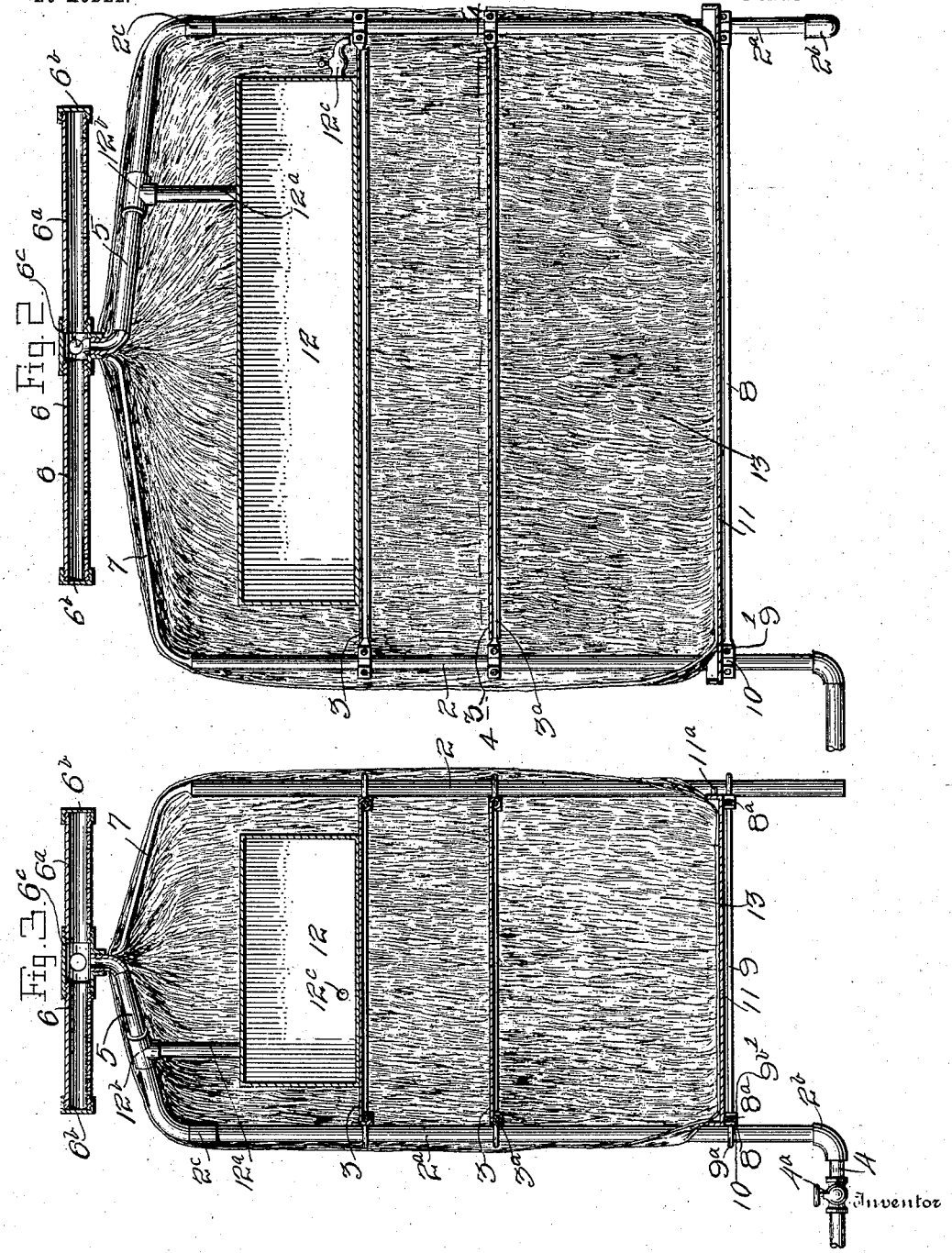

No. 746,623. Patented December 8, 1903.

UNITED STATES PATENT OFFICE.

ZACHARIAH C. WOMBLE, OF WACO, TEXAS.

HYDRAULIC MILK-COOLER.

SPECIFICATION forming part of Letters Patent No. 746,623, dated December 8, 1903.

Application filed April 2, 1903. Serial No. 150,761. (No model.)

*To all whom it may concern:*

Be it known that I, ZACHARIAH C. WOMBLE, a citizen of the United States, residing at Waco, in the county of McLennan and State of Texas, have invented certain new and useful Improvements in Hydraulic Milk-Coolers; and I do declare the following to be a full, clear, and exact description of the invention, such as will enable others skilled in the art to which it appertains to make and use the same.

My invention relates to new and useful improvements in hydraulic milk-coolers.

The object of the invention is to provide simple and inexpensive means for cooling milk, butter, &c., and comprises a suitable frame for supporting the same, which frame also forms the means for conveying the cooling agent to a point above the uppermost support and a cloth or other liquid-absorbent material arranged to inclose the entire top, sides, and ends of the frame and adapted to convey the cooling fluid over and around the supports and to be fed from the discharge portion of the supporting-frame, and thereby become thoroughly saturated and produce, as it were, a porous means for inclosing the supporting-frame constantly charged with the cooling agent or liquid.

My invention further comprises certain details of construction and peculiar combination of parts, all of which will be hereinafter fully described, specifically pointed out in the appended claims, and illustrated in the accompanying drawings, in which—

Figure 1 is a perspective view of my milk-cooling apparatus. Fig. 2 is a vertically-longitudinal section through the same. Fig. 3 is a transverse section, and Fig. 4 is a detail horizontal section on the line 4 4 of Fig. 2.

Referring more particularly to the drawings, the numeral 1 denotes a light but substantial framework, comprising the four vertical corner-posts or pipe-sections 2, preferably of one-half-inch pipes or tubes, united by the horizontal supporting-shelves 3. One of the corner-pipes (denoted by 2ª) has upon its lower end the elbow 2ᵇ, in which an ordinary water-supply pipe (indicated by 4) may be screwed. Said supply or feed pipe may be provided with a regulating-valve 4ª. The upper end of the corner-pipe 2ª has connected to it by the union-coupling 2ᶜ the pipe 5, which curves inwardly and upwardly to the center of the frame 1 above the uppermost shelf 3 and then extends vertically upward. Upon the upper end of this pipe 5 is secured the sprayer or nozzle 6, which is preferably in the form of a cross or X-shaped and composed of the perforated pipe-sections 6ª, having their outer ends closed by the caps 6ᵇ and their inner ends screwed into the cross fitting or coupling 6ᶜ, which is screwed onto the top of the pipe 5. The upper ends of the other three corner posts or pipes 2 are closed, having projecting from them the heavy wires, rods, or pipes 7, which are curved inwardly to the center and then upwardly, similar to the pipe 5, and terminate below the sprayer or nozzle 6.

The horizontal supporting-shelves 3, which connect and brace the corner posts or pipes, are preferably made of galvanized sheet metal, with their end and side edges beaded, as at 3ª, to engage the end and side stay-rods 8 and 9, which securely connect and brace the corner-pipes and form rigid supporting members for the shelves 3. As a simple means for securing the rods to the pipes 2, the ends of the side rods 9 are bent to form clip portions 9ª, provided to lap the posts or pipes 2, and the said clip portions 9ª are braced and held upon the said pipes 2 by the apertured cross-pieces 10, through which the clip ends of the rods 9 pass. The extremities of the side rods 9 are threaded and of a length sufficient to permit the eyes 8ª of the end rods 8 engaging therewith and to receive the clamp-nuts 9ᵇ, as clearly shown in Fig. 4.

11 denotes a drip-collecting pan which is upon the lowest set of side and end stay-rods 8 and 9, and the said pan is of greater length and width than the shelves 3, whereby the drippings from the shelves will be caught by the pan. The pan at one corner has a drain outlet-pipe 11ª, which preferably projects into the adjacent corner pipe or post 2, the lower end of which may be connected to a waste-pipe leading to the sewer or any other desired place to receive waste water.

Upon the uppermost shelf 3 I support a water-tank 12, which is kept constantly supplied or filled with water by the pipe 12ª, which is tapped into the pipe 5 at 12ᵇ. The tank 12 is provided with the draw-off faucet 12ᶜ.

13 denotes the closure member, which consists of a thin absorbent material—cheese or other cloth—which becomes saturated and on which the saturating solution will slowly trickle or drop downward. The covering 12, it will be noticed, entirely surrounds the frame 1 and is supported by the centrally-assembled rods 7 and pipe 5 below the sprayer or nozzle 6, and by reason of the peculiar relation of said rods and pipe and the side and end portions of the frame the top part of the covering is caused to incline toward the sides and ends of the frame, such arrangement of the top covering being provided so as to entirely inclose the supporting-frame and at the same time permit of a free gravitation of the cooling liquid toward the sides and ends of the apparatus and with a minimum dripping or waste of the saturating solution from the saturated material onto the shelves.

The cloth covering 12 extends down to the lower portion of the frame and entirely over the side and end portions thereof, and when in use the lower ends thereof are supported in the tray or pan 11. As will be seen in Figs. 2 and 3, the shelves 3 are slightly narrower and of less length than the pipe-frame, and by reason thereof the cloth covering 12 will be held from contact with the shelves 3, thus preventing the liquid from passing from the cloth onto the shelves. By means of the valve 4ª the dripping or spraying of the water or cooling liquid through the nozzle 6 upon the top of the covering 12 may be regulated.

From the foregoing description, taken in connection with the accompanying drawings, it is thought that the construction, operation, and advantages of my invention will be readily apparent without requiring a more extended explanation.

Various changes in the form, proportion, and the minor details of construction may be resorted to without departing from the principle or sacrificing any of the advantages of this invention.

Having thus particularly described my invention, what I claim, and desire to secure by Letters Patent, is—

1. A cooling apparatus, comprising a supporting-frame, having a hollow rigid frame-section forming a water-conductor, shelves mounted upon said frame, an absorbent covering for said frame, and a discharge-nozzle carried by said hollow rigid frame-section and adapted to discharge onto the absorbent covering, whereby the said frame-section forms a combined supporting member and conduit for the supply of the water, substantially as described.

2. A cooling apparatus, comprising a supporting-frame having hollow rigid frame-sections, one forming a water-supply passage and the other a drain-outlet, shelves mounted upon said frame, an absorbent covering for said frame, a discharge nozzle or sprayer carried by the supply-passage section, a drip-pan supported by the frame below the shelves, and a drain-outlet from the pan to the said drain-outlet section, substantially as described.

3. A cooling apparatus, consisting of a frame composed of connected pipe-sections having their upper portions inwardly projected and clustered to form a central top support, one of said sections forming a water-conductor and another a drain-outlet, a discharge nozzle or sprayer upon the upper end of said conductor, shelves mounted upon the frame, an absorbent covering for said frame supportable upon the said clustered ends of the pipe-sections, a drip-pan supported by the frame below the shelves and a drain-outlet from the pan to the drain-outlet section of the frame, substantially as described.

4. A cooling apparatus, consisting of a frame comprising corner-posts formed of connected pipe-sections, said corner-posts being tied and braced together, one of the corner-posts being hollow or tubular to form a water-conductor and the upper ends of the several posts being inwardly deflected to form at the top of the frame a skeleton support, an absorbent covering for the frame adapted to rest upon said support and a sprayer connected to the water-conducting portion of the frame and supported thereby above said support and adapted to discharge the inflowing water down upon said covering, substantially as described.

5. A cooling apparatus, comprising a supporting-frame consisting of corner-posts connected and braced and formed of hollow or tubular sections, one of said sections constituting a water-conductor and the upper ends of all the sections being bent or curved inwardly so as to cluster together and form a support, shelves supported by said frame, an absorbent covering for the frame supportable on the said support formed by the clustered ends of the corner-posts, a sprayer connected to the water-conducting portion of the frame above the said supporting portion thereof and adapted to direct water down upon said covering, a water-tank supported by the upper shelf, and a connection between the conducting portion of the frame and tank for supplying the latter with water.

In testimony whereof I have hereunto set my hand in presence of two subscribing witnesses.

ZAC. C. WOMBLE.

Witnesses:
G. W. COLEMAN,
J. E. COLEMAN.